US008816252B2

(12) United States Patent
Bisson

(10) Patent No.: US 8,816,252 B2
(45) Date of Patent: Aug. 26, 2014

(54) METHODS AND APPARATUS FOR LOCALIZED HEATING AND DEFORMATION OF GLASS SHEETS

(75) Inventor: Antoine G. D. Bisson, Montigny Lencoup (FR)

(73) Assignee: Corning Incorporated, Corning, NY (US)

( * ) Notice: Subject to any disclaimer, the term of this patent is extended or adjusted under 35 U.S.C. 154(b) by 373 days.

(21) Appl. No.: 13/302,586

(22) Filed: Nov. 22, 2011

(65) Prior Publication Data

US 2013/0125592 A1 May 23, 2013

(51) Int. Cl.
| F27B 9/36 | (2006.01) |
| H05B 3/10 | (2006.01) |
| C03B 23/023 | (2006.01) |
| C03B 23/025 | (2006.01) |
| F27B 9/06 | (2006.01) |

(52) U.S. Cl.
CPC ............ *C03B 23/0258* (2013.01); *F27B 9/36* (2013.01); *F27B 9/063* (2013.01); *H05B 2203/025* (2013.01)
USPC ............ 219/388; 219/411; 165/111; 392/417

(58) Field of Classification Search
CPC ... B29C 2035/0822; F27B 9/063; F27B 9/12; F27B 9/36; F27B 2009/3607; F27D 11/02; H05B 3/16; H05B 3/40; H05B 3/42; H05B 3/48; H05B 2203/002; H05B 2203/025; H05B 2203/032; C03B 23/0086; C03B 29/08
See application file for complete search history.

(56) References Cited

U.S. PATENT DOCUMENTS

| 3,245,772 | A | * | 4/1966 | Cypher et al. | 65/111 |
| 4,119,426 | A | * | 10/1978 | Kelly | 65/111 |
| 5,173,102 | A | * | 12/1992 | Weber et al. | 65/273 |
| 5,337,393 | A | * | 8/1994 | Reunamaki | 392/417 |
| 5,679,123 | A | * | 10/1997 | Bennett et al. | 65/107 |
| 6,092,393 | A | * | 7/2000 | Mathivat et al. | 65/106 |
| 6,172,336 | B1 | * | 1/2001 | Vehmas | 219/388 |
| 6,599,386 | B2 | * | 7/2003 | Swanson et al. | 156/272.2 |
| 7,342,210 | B2 | | 3/2008 | Fergason | 250/206 |

(Continued)

FOREIGN PATENT DOCUMENTS

| EP | 0376509 | 7/1990 | C03B 29/08 |
| EP | 0476693 | 3/1992 | C03B 23/025 |

(Continued)

OTHER PUBLICATIONS

International Search Report and Written Opinion dated Feb. 28, 2013, International Application No. PCT/US2012/063776, Filed Nov. 7, 2012.

*Primary Examiner* — Joseph M Pelham
(74) *Attorney, Agent, or Firm* — Ryan T. Hardee

(57) ABSTRACT

Methods and apparatus provide for: an electrically conductive heating element having a length extending in a lateral direction between first and second ends, and one or more output surfaces operating to direct heat therefrom in a direction transverse to the lateral direction; and a carrying structure operable to support a glass sheet such that a major surface of the glass sheet is oriented towards the heat emanating from the one or more output surfaces of the heating element, where the electrically conductive heating element includes at least one heat flux variation feature operating to produce differing magnitudes of heat to emanate from at least two of the output surfaces of the heating element.

22 Claims, 8 Drawing Sheets

(56) References Cited

U.S. PATENT DOCUMENTS

| | | | |
|---|---|---|---|
| 7,989,736 B2 * | 8/2011 | Park et al. | 219/388 |
| 8,397,540 B2 * | 3/2013 | Dannoux et al. | 65/291 |
| 8,418,502 B2 * | 4/2013 | Yajima et al. | 65/106 |
| 8,479,540 B2 * | 7/2013 | Vehmas | 65/111 |
| 2001/0039991 A1 * | 11/2001 | Swanson et al. | 156/108 |
| 2006/0042748 A1 * | 3/2006 | Hasegawa et al. | 156/285 |
| 2012/0279257 A1 * | 11/2012 | Dannoux et al. | 65/103 |

FOREIGN PATENT DOCUMENTS

| | | | |
|---|---|---|---|
| EP | 0659697 | 6/1995 | C03B 19/08 |
| EP | 2233443 | 9/2010 | C03B 23/025 |
| GB | 2320021 A * | 6/1998 | C03B 23/025 |
| WO | WO2006/095006 | 9/2006 | C03B 29/08 |

\* cited by examiner

104

METHODS AND APPARATUS FOR LOCALIZED HEATING AND DEFORMATION OF GLASS SHEETS

FIELD

The present disclosure relates to methods and apparatus for localized heating of glass, such as for deformation of glass sheets during a manufacturing process.

BACKGROUND

Glass components produced via reforming of initial material parts, such as glass sheets, have many applications, a significant one being glazing for the automotive industry. Reformed glass sheets are also used in display applications, for example in producing liquid crystal displays (LCDs), electrophoretic displays (EPD), organic light emitting diode displays (OLEDs), plasma display panels (PDPs), or the like.

Prior to reforming, glass sheets are commonly fabricated by flowing molten glass to a forming body whereby a glass ribbon may be formed by a variety of ribbon forming process techniques, for example, slot draw, float, down-draw, fusion down-draw, or up-draw. The glass ribbon may then be subsequently divided to provide sheet glass suitable for further processing into a desired intermediate of a final product. Recently there has been a growing interest in extremely high quality thin glass sheets that are reformed into more complex three dimensional shapes, such as a combination of flat portions and locally highly curved shapes.

The common processes used to reform glass sheets often involve a heating step at temperatures where deformation occurs under gravity or under mechanical actuation. Heating of a glass sheet using conventional techniques involves application of heat to the whole surface of the glass sheet. For example, known means for achieving heating of a glass sheet for reforming include the use of metal-based wires wound around a ceramic support. However, such techniques have not heretofore been satisfactory because heating of the entire glass sheet is not necessarily a desirable result, especially in a reforming operation where only local deformations are needed and heating of other portions of the glass sheet could result in damage and/or degradation of physical, optical and/or electrical characteristics.

There are known means to achieve the heating of glass sheets in furnaces, such as the use of electrically conductive ceramic materials, the most common being silicon carbide and disilicide molybdenum. The silicon carbide and/or disilicide molybdenum materials are generally shaped as straight or curved tubes for furnace applications. These types of heating elements are used to dissipate power via heat radiation into the furnace environment. Although the use of such electrically conductive ceramics to heat furnaces is well known in the glass industry, there has been no development or application of such techniques to heat a specific, localized area on a glass sheet as would be desirable in a reforming process.

Thus, there are needs for methods and apparatus for localized heating of glass sheets while retaining a high level of flatness in desired areas of a glass sheet; retaining pristine aspects of the glass sheet; obtaining a desired amount of deformation in certain areas of interest; and maintaining a high level of dimensional control. Such process and apparatus can be suitable for reforming glass sheets in a wide range of applications, such as display applications.

SUMMARY

One or more embodiments of the present disclosure are directed to the use of one or more electrically conductive materials as heating elements that are operable to heat specific, localized areas of a glass sheet. Such embodiments permit the generation of a large heat source from a very localized and concentrated area (or areas). One or more embodiments operate to heat certain localized areas of the glass sheet without physical contact by a heating source, and eventually induce a desired deformation in the glass sheet.

The system may include the heating element, electrical connections, and an optional thermal shield located on part of the heating element, all combined to direct localized heat to the glass sheet. By way of example, the system may be employed in an environment where ambient temperatures reach about 600° C., with a cycle time of a couple of minutes, depending on the exigencies of the application.

The heating element is preferably formed from one or more materials having certain characteristics, such as: (i) electrical conductivity such that a desired magnitude of heat is produced with a reasonably sized voltage and current source; (ii) mechanical strength such that the components of the system do not deform during use and over cycling, and also supports a large length over section ratio (to apply to a relatively large glass sheet); and (iii) mechanical properties such that the heating element may be machined to obtain a desired shape (and resultant localized and variable heating profile). Suitable materials for forming the heating element include electrically conductive ceramic materials, such as silicon carbide, disilicide molybdenum, titanium diboride, etc.

In accordance with one or more embodiments, an apparatus includes: an electrically conductive heating element having a length extending in a lateral direction between first and second ends, and one or more output surfaces operating to direct heat therefrom in a direction transverse to the lateral direction; and a carrying structure operable to support a glass sheet such that a major surface of the glass sheet is oriented towards the heat emanating from the one or more output surfaces of the heating element. The electrically conductive heating element includes at least one heat variation feature operating to produce differing magnitudes of heat to emanate from at least two of the output surfaces of the heating element.

The at least one heat variation feature operates to produce a differing magnitude of heat to emanate from the output surfaces of the heating element located at at least one of the first and second ends thereof as compared with one or more output surfaces located intermediate thereto. For example, the at least one heat variation feature operates to produce higher magnitude heat emanating from the output surfaces located at the first and second ends as compared with intermediate positions. By way of further example, such a configuration may be operable to heat first and second edge regions of the glass sheet to higher temperatures than intermediate regions of the glass sheet.

The heating element is preferably formed from an electrically conductive ceramic material, such as one or more of silicon carbide, disilicide molybdenum, titanium diboride, etc.

The heating element may include a height dimension, which is transverse to the length and extends in a direction generally normal to a plane of the major surface of the glass sheet; and the at least one heat variation feature may include that the height dimension varies between the first and second ends of the heating element, such that the differing magnitudes of heat emanate from the output surfaces of the heating element in response to current flowing through the heating element in the lateral direction.

Alternatively or additionally, the heating element may include a width dimension, which is transverse to the length and extends in a direction generally parallel to a plane of the major surface of the glass sheet; and the at least one heat variation feature may include that the width dimension varies between the first and second ends of the heating element, such that the differing magnitudes of heat emanate from the output surfaces of the heating element in response to current flowing through the heating element in the lateral direction.

Alternatively or additionally the output surfaces of the heating element may include respective surface area portions, which extend in directions generally parallel to a plane of the major surface of the glass sheet; and the at least one heat variation feature may include that respective surface area portions vary in size between the first and second ends of the heating element, such that the differing magnitudes of heat emanate from the output surfaces of the heating element in response to current flowing through the heating element in the lateral direction.

Alternatively or additionally the heating element may include a cross-sectional area dimension, which is transverse to the length and extends in a directions generally normal to the lateral direction; and the at least one heat variation feature may include that the cross-sectional area dimension varies between the first and second ends of the heating element, such that the differing magnitudes of heat emanate from the output surfaces of the heating element in response to current flowing through the heating element in the lateral direction.

Other aspects, features, and advantages of the present disclosure will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments are not limited to the precise arrangements and instrumentalities shown.

DETAILED DESCRIPTION OF THE PREFERRED EMBODIMENTS

Figure 1:
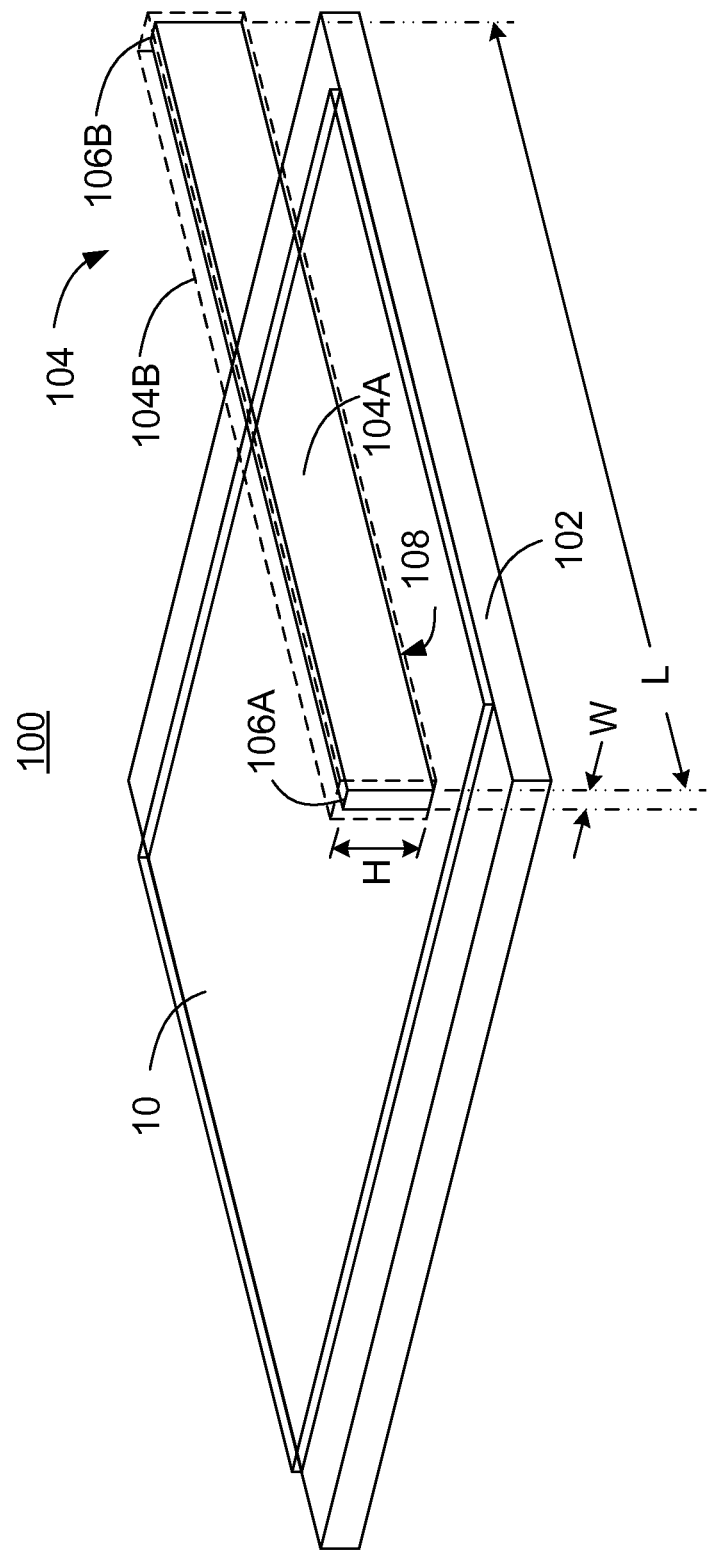
FIG. 1 is a simplified schematic diagram of a system operable to heat specific, localized areas of a glass sheet in accordance with one or more embodiments.

With reference to the drawings wherein like numerals indicate like elements there is shown in FIG. 1 a simplified schematic diagram of a system 100 operable to heat specific, localized areas of a glass sheet 10. Such embodiments permit the generation of a large heat source from a very localized and concentrated area (or areas) to heat certain localized areas of the glass sheet 10 without physical contact by the heating source, and eventually induce a desired deformation in the glass sheet 10.

The system 100 includes a carrying structure 102 and a heating element 104 spaced away from the carrying structure 102 such that the glass sheet 10 may be interposed therebetween. It is preferred that a length (L) of the heating element 104 (oriented in a lateral direction) is sufficient to span an entire length (or width) of the glass sheet 10. The carrying structure 102 is operable to support the glass sheet 10 such that a major surface thereof is oriented towards the heating element 104. The carrying structure 102 may be operable to move the glass sheet 10 relative to the heating element 104, such as by way of an appropriate conveying mechanism and/or by way of a fluid cushion. Alternative embodiments may employ a mechanism for moving the heating element 104 if the exigencies of the application require.

The heating element 104 is preferably electrically conductive, such that heat is produced in response to applying voltage thereacross and driving current therethrough. Although not shown, such voltage and current may be applied via a suitable power source coupled to the heating element 104 via electrical contacts on opposing, lateral, first and second ends 106A, 106B. The heat generated by the heating element 104 is preferably characterized by heat emanating from one or more output surfaces 108 operating to direct such heat in a direction transverse to the lateral direction and toward the glass sheet 10.

For reasons that will be discussed in more detail below, the heating element 104 is preferably formed from an electrically conductive ceramic material. Such electrically conductive ceramic material may include one or more of: silicon carbide, disilicide molybdenum, titanium diboride, etc.

In this embodiment, the heating element 104 is formed from a core of electrically conductive ceramic material 104A surrounded by a shielding material 104B. More specifically, the shielding material 104B preferably surrounds the core 104A except for at least portions of the output surface(s) 108. In this example, the shielding material 104B does not surround or cover at least portions of the output surface(s) 108 directed toward the glass sheet 10. Any of the known thermally insulating materials exhibiting suitable characteristics for the applications discussed herein may be employed to produce the shielding material 104B. One example of shield material is aluminosilicate refractory fibers with low thermal conducitivity. Such material may be machined from a bulk part or obtained from gelification of a humid felt (castable ceramic, as Rescor 740 or Wrap-it 372 UHT from COTRONICS).

Among the advantages of employing an electrically conductive ceramic material in forming the heating element 104 is that such materials (if the composition, size, and shape are carefully selected) generate a relatively large heat from a very localized and concentrated area or areas. This is in contrast to conventional wire wound ceramic heating tubes, which are characterized by relatively lower power density (measured by power emitted from/onto a given surface area). The higher power density of the heating element 104 may be advantageously employed to decrease a surface temperature (of at least the output surface(s) 108) and shift the heat and resultant radiation spectrum towards higher wavelengths, where materials like glass exhibit higher absorption coefficients, thereby improving the heating rate of the glass sheet 10.

Another advantage of using an electrically conductive ceramic material, like silicon carbide, is that the thermal conductivity is high, and thus heat is generated in the heating element 104 and is released to the surrounding environment mainly through the output (emitting) surface(s) 108. The high conductivity of the electrically conductive ceramic material favors a high heat transfer from the bulk of the material to the output surface(s) 108 thereof, allowing fast dynamic use of the element.

Further, the mechanical properties of certain types of electrically conductive ceramic materials, like silicon carbide, are stable when maintained at high temperatures. Such a characteristic permits the minimization of the size and shape (minimizing a volume) of the heating element 104 while still exhibiting sufficient thermal inertia. It is therefore, possible to make the heating element 104 of sufficient length to span the entire glass sheet 10, while only supporting the heating element 104 at the first and second ends 106A, 106B, preferably by the electrical connections thereto. The stable mechanical properties of the material minimize any deformations in the shape and orientation of the heating element 104, which would be detrimental to the ability to control with precision the heat transfer process to the glass sheet 10.

Additionally, another advantage of forming the heating element 104 from silicon carbide (as compared with, e.g., disilicide molybdenum or other conductive ceramics) is the machinability of the material. Even when the hardness of the material is high, it is possible to machine the material without significant risks of breakage. This is particularly desirable when certain heat generating and emitting properties are desired by machining the heating element 104 into certain shapes. The relationship of such shapes and heat emission properties will be discussed in more detail below. If the manufacture of a large number of heating elements 104 is desired, then silicon carbide may be molded while in a green state, and thereafter sintered.

Figure 2:
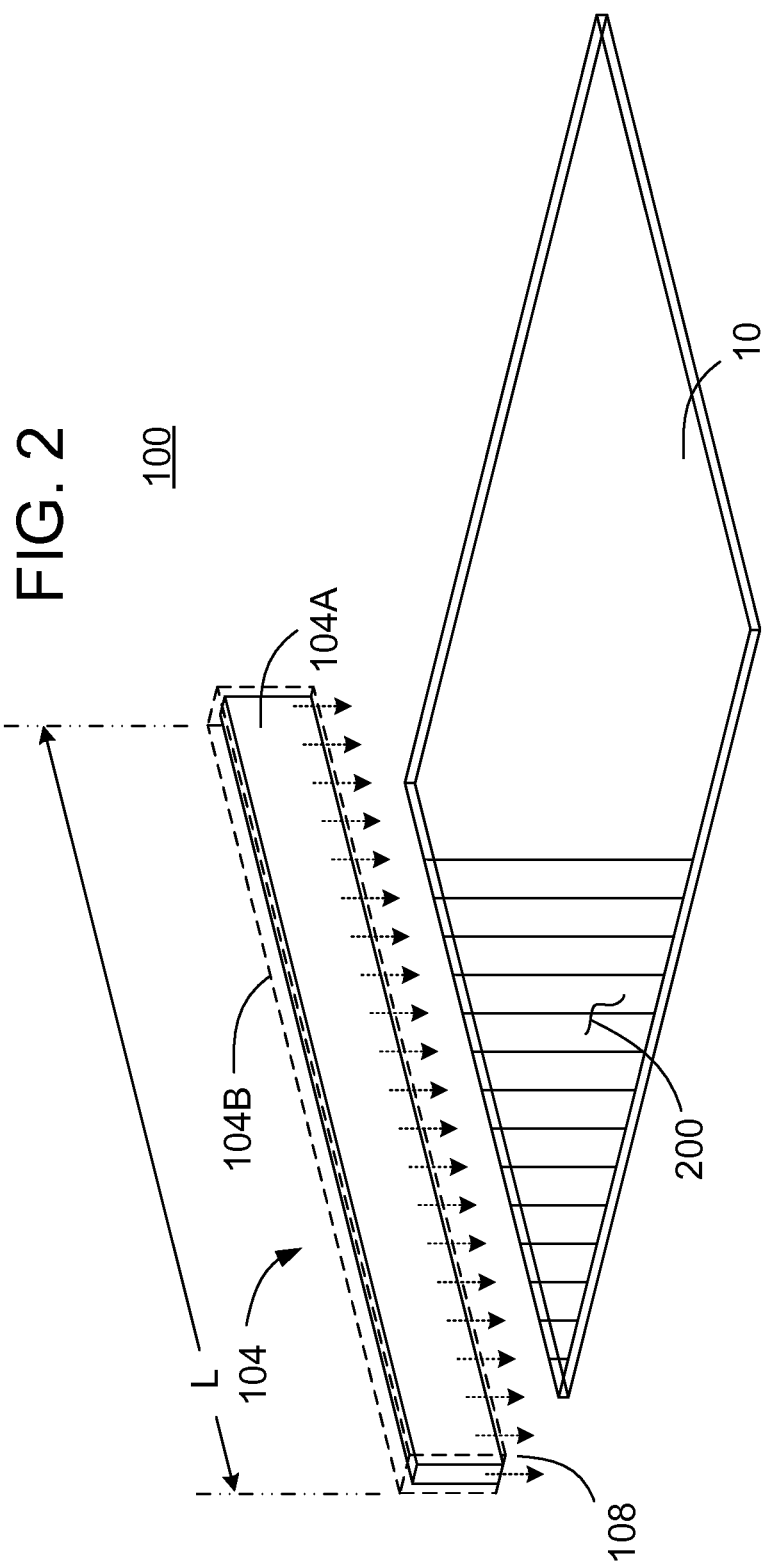
FIG. 2 is a simplified schematic diagram of certain aspects of one or more embodiments of the system of FIG. 1 relating to one or more specific heating profiles.

Reference is now made to FIG. 2, which is a simplified schematic diagram of certain aspects of one or more embodiments of the system 100 of FIG. 1 relating to one or more specific heating profiles generated by the heating element 104 onto the glass sheet 10. Assuming that the shape of the core 104A is generally uniform and that the shield 104B exposes a relatively uniformly shaped output surface 108, then the heat (represented by the dashed arrows) emanating from the output surface 108 is generally uniform along the length L of the heating element 104. Also assuming that the exposure of the major surface of the glass sheet 10 to the heat from the heating element 104 is generally uniform (e.g., by constant conveyance of the glass sheet 10 past the heating element 10), then the heating profile of the glass sheet 10 would likewise be uniform over the entire sheet (as is illustrated by the uniform cross-hatching 200).

Figure 3:
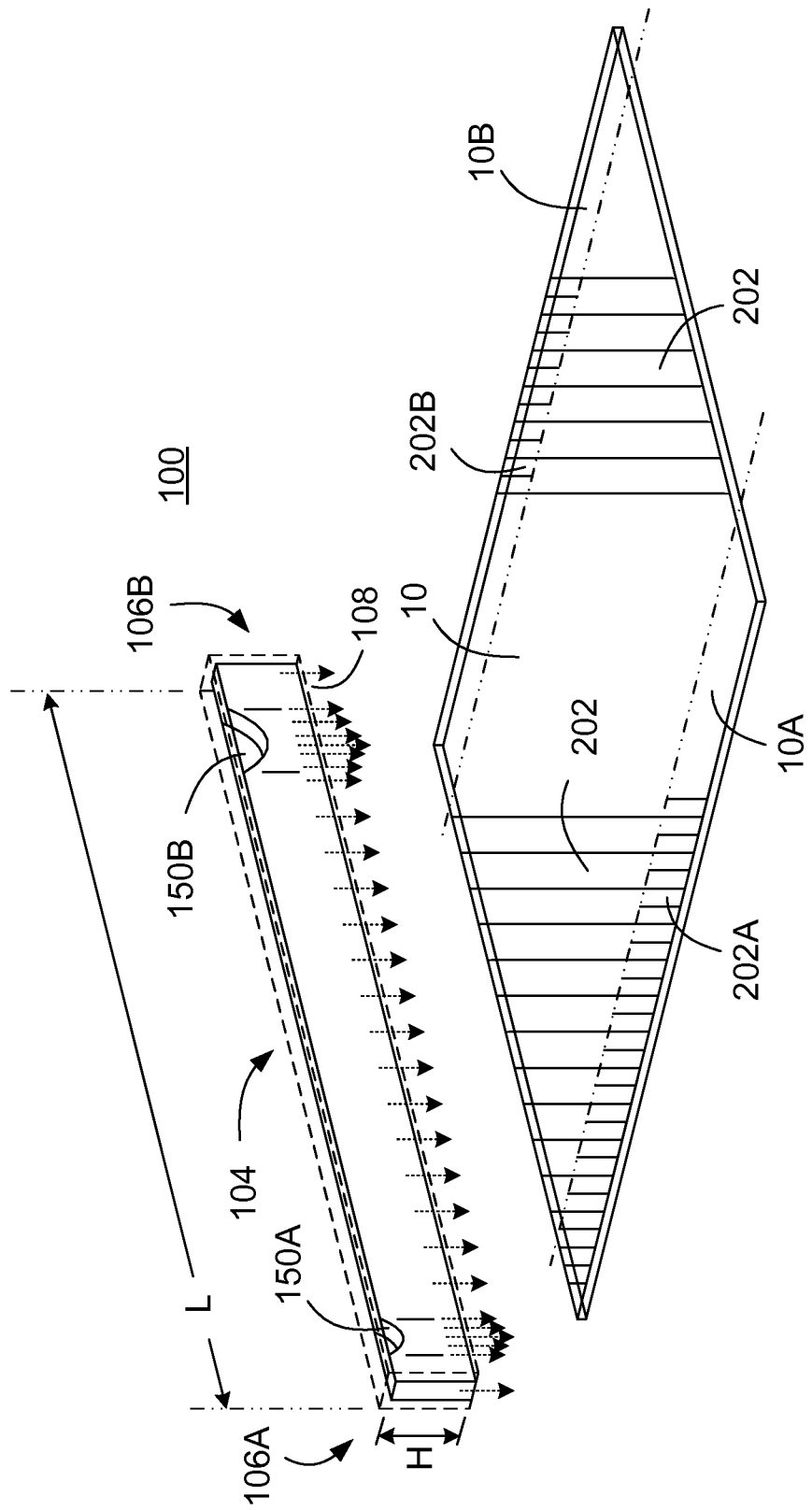
FIG. 3 is a simplified schematic diagram of alternative aspects of one or more embodiments of the system of FIG. 1 relating to one or more further heating profiles.

With reference to FIG. 3, it is preferred that the heating element 104 includes at least one heat variation feature operating to produce differing magnitudes of heat emanating from the output surface(s) 108, thereby producing non-uniform heating of the glass sheet 10. In this example, the heat variation feature is achieved by introducing variations into the size and shape of the heating element core 104A along its length, L. In particular, the heating element core 104A includes a height dimension, H, which is transverse to the length and extends in a direction generally normal to a plane of the major surface of the glass sheet 10. The height dimension H varies between the first and second ends 106A, 106B of the heating element core 104A, such that differing magnitudes of heat (dashed arrows) emanate from the output surface(s) 108 of the heating element 104 in response to current flowing through the heating element 104 in the lateral direction (between the ends 106A, 106B).

In this embodiment, curvilinear cut-outs (or recesses) 150A, 150B contribute to the variation in the height dimension, H, and resultant difference in magnitudes of heat emanating from the output surface(s) 108. As will be discussed in more detail below, the changes in height H result in higher heat emanating from the portions of the output surface 108 proximate to the cut-outs 150A, 150B as compared with other portions of the output surface 108. Thus, if desired the higher heat resulting from the respective cut-outs 150A, 150B may be different at at least one of the first and second ends 106A, 106B as compared with one or more portions of the output surface 108 located intermediate thereto. In the illustrated example, the height dimension proximate to the second cut-out 150B is more radically varied as compared with the height dimension proximate to the first cut-out 150A, thereby resulting in differing heat at each of the first and second ends 106A, 106B. In this case, the heat variation feature operates to produce a higher magnitude heat from the output surface 108 at the second end 106B as compared with the first end 106A, both of which are higher than heat at intermediate positions.

The carrying structure (not shown) may operate to orient the respective first and second edge regions 10A, 10B of the major surface of the glass sheet 10 towards the heat emanating from the first and second ends 106A, 106B of the heating element 104. Consequently, the apparatus operates to heat the first and second edge regions 10A, 10B of the glass sheet 10 to higher temperatures than intermediate regions of the glass sheet 10, as is illustrated by higher density cross-hatching 202A and 202B as compared with cross-hatching 202. It is noted that the cross-hatching 202A and 202B illustrated in the first and second edge regions 10A, 10B is intended to illustrate that at least portions of the regions 10A, 10B are at elevated temperatures as compared with the temperatures of intermediate regions of the glass sheet 10 (marked by cross-hatching 202). The fact that cut-outs 150A, 150B are curvilinear might result in non-uniform heating within the first and second edge regions 10A, 10B; however, for simplicity, the cross-hatching 202A and 202B is illustrated as relatively uniform within such regions. This does not mean that the temperatures must be uniform, or must be non-uniform, within the first and second edge regions 10A, 10B, as either is possible with proper shaping of the core 104A.

Advantageously, the above embodiment is operable to heat specific, localized areas of the glass sheet 10 (in this case the edge regions), without physical contact by a heating source, and without heating the entire glass sheet 10. This ensures that the localized heating may be used to achieve a desired result without subjecting other portions of the glass sheet 10 to damage and/or degradation of physical, optical and/or electrical characteristics. Furthermore, the illustrated methods and apparatus retains a high level of flatness in desired areas of the glass sheet 10; retains pristine aspects of the glass sheet 10; and obtains a desired amount of heating in certain areas of interest at a high level of dimensional control. These heating characteristics may be employed, for example, to induce a desired localized deformation in select areas of the glass sheet 10, such as for reforming the glass sheet 10 into a desired shape, which will be discussed in more detail later herein.

Figure 4:
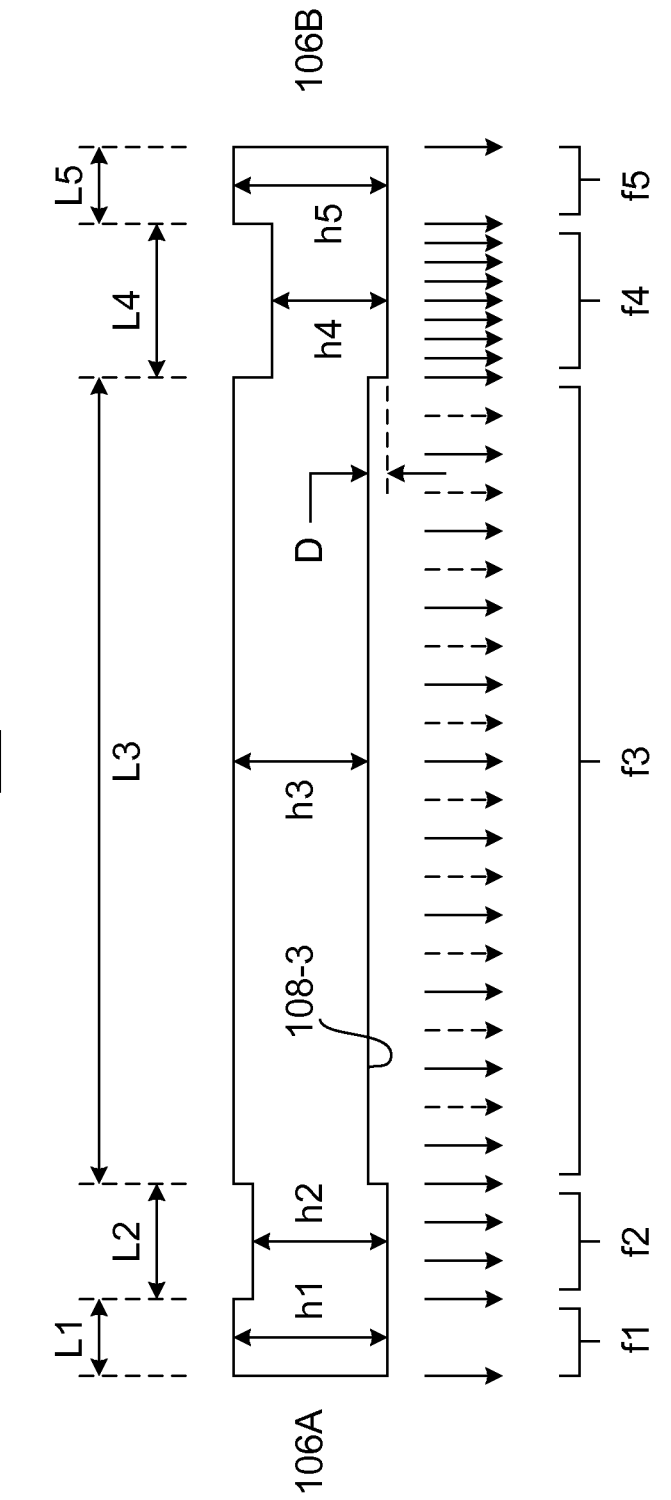
FIG. 4 is an elevational view of a heating element suitable for use in connection with one or more embodiments herein, which has at least one heat variation feature operating to produce heat of certain characteristics.

With reference to FIG. 4, a more generalized discussion of possible ways to implement the heat variation feature of the heating element 104 is presented. FIG. 4 is a side-elevational view of another embodiment of the heating element 104, which achieves a number of differing heat characteristics along the length of the element 104, thereby producing alternative non-uniform heating of the glass sheet 10. In general, using a number of different shaping techniques, such as basic machining, it is possible to obtain variable dimensions over various portions of the heating element 104.

For example, it is possible to machine various surfaces of the heating element 104 such that different portions thereof have different height dimensions, H, as was discussed in some detail above. In particular, the heating element 104 of FIG. 4 includes in order: (i) a first height h1 near the first end 106A; (ii) a second height h2 (smaller than the first height h1); (iii) a third height h3 (of similar magnitude as the second height h2); (iv) a fourth height h4 (smaller than any of the other heights); and (v) a fifth height h5 (of similar magnitude as the first height h1). As will be discussed in more detail below, the variation in the height dimension H (as represented by heights h1, h2, h3, h4, and h5) changes a cross-sectional area of the heating element core 104A along its length. This, has a resultant effect on the magnitude of heat produced by the heating element 104 in the volume associated with the given height, and on the magnitude (or density) of the heat emanating from the heating element 104 and/or received by the glass sheet 10.

Assuming a constant width dimension, W, (normal to the view of the drawing in FIG. 4), the heat profile (density) produced by an AC or DC current flowing from end-to-end within the heating element 104 may be represented by the illustrated arrows. In zones f1 and f5, the density of the heat may be relatively low as compared with the densities in zones f2 and f4. In zone f3, the density of the heat emanating from the surface 108-3 might be of a similar magnitude as that of zone f2, however, for reasons that will be discussed in more detail below, the heat available to and/or received by the glass sheet 10 opposite to zone f3 will be lower than in zone f2. Thus, some of the heat arrows in zone f3 are shown in dashed line in FIG. 4. Although not taken into consideration in this example, the respective lengths L1, L2, L3, L4, and L5 of the sections of the heating element core 104A may also have an effect on the magnitude of heat produced within the respective volumes.

Alternatively or additionally, it is possible to machine (or otherwise form) various surfaces of the heating element 104 such that different portions of the output surface(s) 108 are at different distances from the glass sheet during the heating process. The distance between the output surface 108-3 (or portion thereof) and the major surface of the glass sheet 10 in zone f3 is greater than such distances in zones f1, f2, f4, and f5 (by an amount equal to dimension D). Consequently, the magnitude of heat reaching and/or heating the glass sheet 10 in zone f3 is lower, thereby heating the glass sheet in that zone to a lesser degree.

Figure 5:
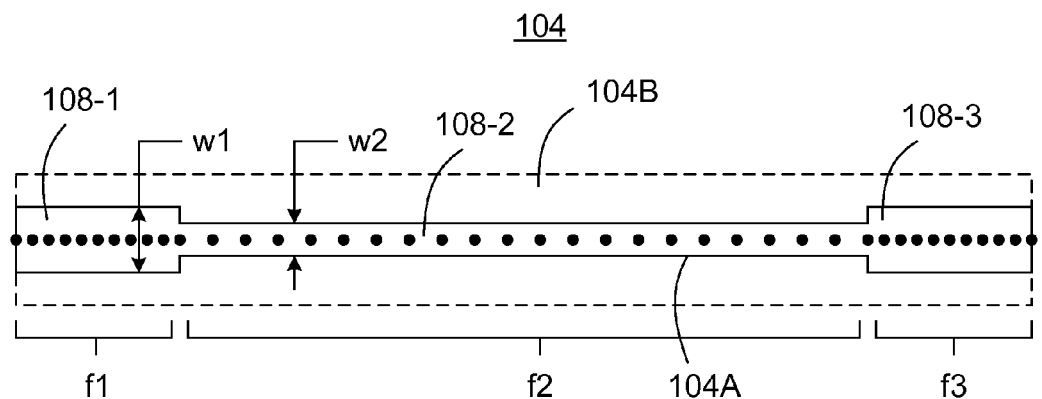
FIG. 5 is a bottom view of a heating element suitable for use in connection with one or more embodiments herein, which has at least one further heat variation feature operating to produce varying localized heat of certain alternative characteristics.
Figure 6:
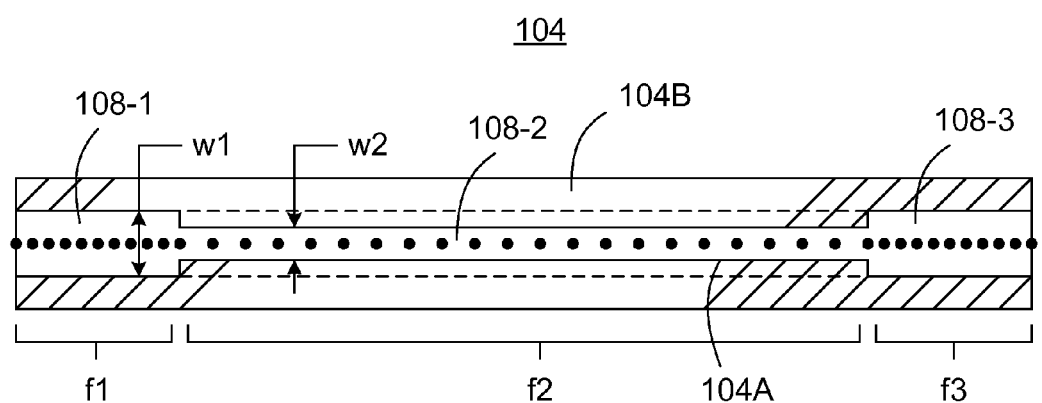
FIG. 6 is a bottom view of a heating element suitable for use in connection with one or more embodiments herein, which has at least one further heat variation feature operating to produce varying localized heat of certain alternative characteristics.

With reference to FIGS. 5-6, it is possible to (alternatively or additionally) machine various surfaces of the heating element 104 such that different portions of the output surface(s) 108 are of differing square area in order to implement the heat variation feature of the heating element 104.

FIG. 5 is a bottom view of the heating element 104, where the heating element core 104A has respective surface area portions, which extend in directions generally parallel to a plane of the major surface of the glass sheet 10. For example, in zones f1 and f3, the heating element core 104A has first and third surface area portions of respective sizes defined incrementally by the same width w1. In zone f2, the heating element core 104A has a second surface area portion of a size defined incrementally by the width w2. Since the density of heat emanating from a surface is proportional to a surface area thereof, the magnitudes of (the density of) the heat emanating from the portions of the output surface 108-1 and 108-3, and reaching and/or heating the glass sheet 10 in zones f1 and f3, is greater than that emitted from portion 108-2 of the output surface in zone f2. Such density of heat is illustrated by the density of dots on the portions 108-1, 108-2, 108-3 of the output surface 108. It is noted that use of the term "density" in this context is intended to refer to the fact that the amount of heat (measured in at least one unit) is greater when sourced from a large surface area, such as from portion 108-1 as compared with portion 108-2. Thus, even though the heat flux density at a given unit area within portion 108-1 might be the same as the heat flux density at the same sized unit area within portion 108-2, the amount of heat (the "density" as used in this context) is said to be greater from portion 108-1 because there is more heat emanating from a larger surface area (per unit length) in that portion as compared with portion 108-2. Although not taken into consideration in this example, the respective cross sectional areas of the heating element core 104A in each zone may also have an effect on the magnitude of heat produced within the respective volumes, and thus the density of the heat emanating from the output surface portions 108-1, 108-2, 108-3 might be different based on differing densities of heat flux produced at the respective surface portions.

FIG. 6 is a bottom view of an alternative embodiment of the heating element 104 in which the heat variation feature is also based on variations in the square areas of portions of the output surface 108. Although the results are similar to the embodiment of FIG. 5, the changes in the effective surface areas of the portions of the output surface 108 are achieved in a different way. In particular, the heating element core 104A has a common, uniform width; however, the thermal shielding material 104B covers portions of the output surface 108 to various degrees in each of the zones. For example, in zones f1 and f3, the portions 108-1 and 108-3 of the output surface 108 of the heating element core 104A are covered by the shield material 104B to the same, minimal extent. This results in first and third surface area portions of respective sizes defined incrementally by the same width w1. In zone f2, the portion 108-2 of the output surface 108 of the heating element core 104A is covered to a larger degree by the shield material 104B. This results in a second surface area portion of a size defined incrementally by the width w2. Thus, the heat emanating from the portions of the output surface 108-1 and 108-3 and reaching and/or heating the glass sheet 10 in zones f1 and f3 is greater than in zone f2. Unlike the embodiment of FIG. 5, the respective cross sectional areas of the heating element core 104A in each zone is constant, and thus, should not introduce variation as to the relative magnitude of heat produced within the respective volumes.

Figure 7:
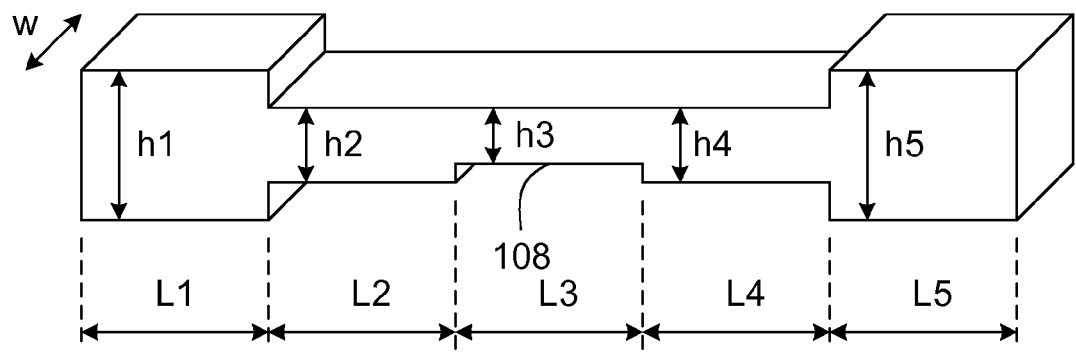
FIG. 7 is a perspective view of a heating element suitable for use in connection with one or more embodiments herein, which has at least one further heat variation feature operating to produce heat of certain alternative characteristics.

The above embodiments and the relationships of the respective geometric properties of the heating element 104 to the heat will be further developed in connection with a further embodiment illustrated in FIG. 7, which is a perspective view of a heating element core 104A, which includes a number of heat variation features operating to produce heat of certain characteristics. In this regard, it is to be understood that the embodiments described herein rely on relationships between the geometric properties of the core 104A and the resultant incremental and/or bulk resistance of the electrically conductive material (e.g., ceramic). This permits the artisan to locally modulate the heat generated within respective volumes of the core 104A, and therefore the resulting heat emanating from the core 104A and/or received by respective areas or regions of the glass sheet 10.

In connection with the heat radiating from any given surface or portion of a surface of the heating element core 104A, an artisan may assume that the given surface operates as a Lambertian radiator (grey body). Heat from such a surface radiates towards a given target (in this case the glass sheet 10) in accordance with the following formula:

$$Q = \epsilon \sigma S (T_s^4 - T_t^4)$$

where Q is the heat emitted by an associated portion of surface area S; $\epsilon$ is the emissivity of the surface (usually about 0.8 for a ceramic, oxidized metal, to about 0.9 for a material like silicon carbide); $\sigma$ is the Stefan-Boltzmann constant (5.67 $10^{-8}$ SI); $T_s$ is a temperature of the surface; and $T_t$ is a surface temperature of the glass sheet 10.

In addition to the surface area of the heat emitting surface, the distance thereof to the glass sheet 10 impacts the received heat flux, which as discussed above may be used as a way for the artisan to modulate heating of the glass sheet 10 along the length L of the heating element 104. The relationship between such distance and the modulation is provided by the following equation:

$$d^2 \varphi_D = \frac{\sigma T^4}{\pi} dS \cos \beta d\omega$$

where $d\varphi_D$ is the elementary flux emitted in the direction D (the general direction toward the glass sheet 10); dS is the elementary surface area of the heat emitting surface; $\omega$ is an elementary solid angle around the D direction; $\beta$ is an angle between the normal of the emitting surface and the direction D; and T is a temperature of the heat emitting surface.

Finally, the heat generated by electrical current within a given elemental volume of the heating element core 104A is provided by Joule's law:

$$P = Ri^2$$

where, P is the power generated by the electrical current flowing into a resistor; R is the electrical resistance of the resistor, and I is the electrical current.

The resistance of a given elemental volume of the heating element core 104A depends on intrinsic properties of the material, the electrical resistivity, and on the geometry thereof, which is defined by the following formula:

$$R = \frac{\rho L}{S}$$

where $\rho$ is the electrical resistivity of the heating element core 104A; L is a length of a given portion of the heating element core 104A (in a direction of the current flow from end-to-end); and S is a cross-sectional area of the given portion of the heating element core 104A (normal to the current flow direction).

With specific reference to FIG. 7, the cross-sectional area changes from portion to portion along the length of the heating element core 104A may be analogized to the behavior of resistors connected in series in an electronic circuit. In such an example, the current through the length of the core 104A is assumed to be constant; however, the resultant heat source from the output surface 108 is varied according to the geometry of each given portion of the core 104A. In the illustrated example, the width W and the respective lengths L1, L2, L3, L4, L5 of the core 104A are constant, thereby yielding constant output surface areas. The respective heights h1, h2, and h3 are progressively smaller, however, yielding progressively smaller cross-sectional areas resulting in progressively higher current and heat emanating from the core 104A. Thus, the power (heat) produced within each section is progressively higher from L1 to L2 to L3, and then progressively lower from L3 to L4 to L5. Based on the above, the heat emanating from the respective sections of the output surface 108 will vary based only on the variation in heights h1, h2, h3, h4, h5 (and resultant effect on the cross sectional area of each section). It should be noted, however, that the respective distances between each portion of the output surface 108 and the glass sheet 10 will vary along the length of the heating element core 104A, thereby influencing the heating of the glass sheet 10 in accordance with the formula above.

It is noted that the incremental electrical resistivity of the material of the heating element core 104A may also be varied to modulate the heat source. If such variation is properly controlled, then the resultant heat generated in respective sections of the heating element 104 may likewise be adjusted.

Figure 8:
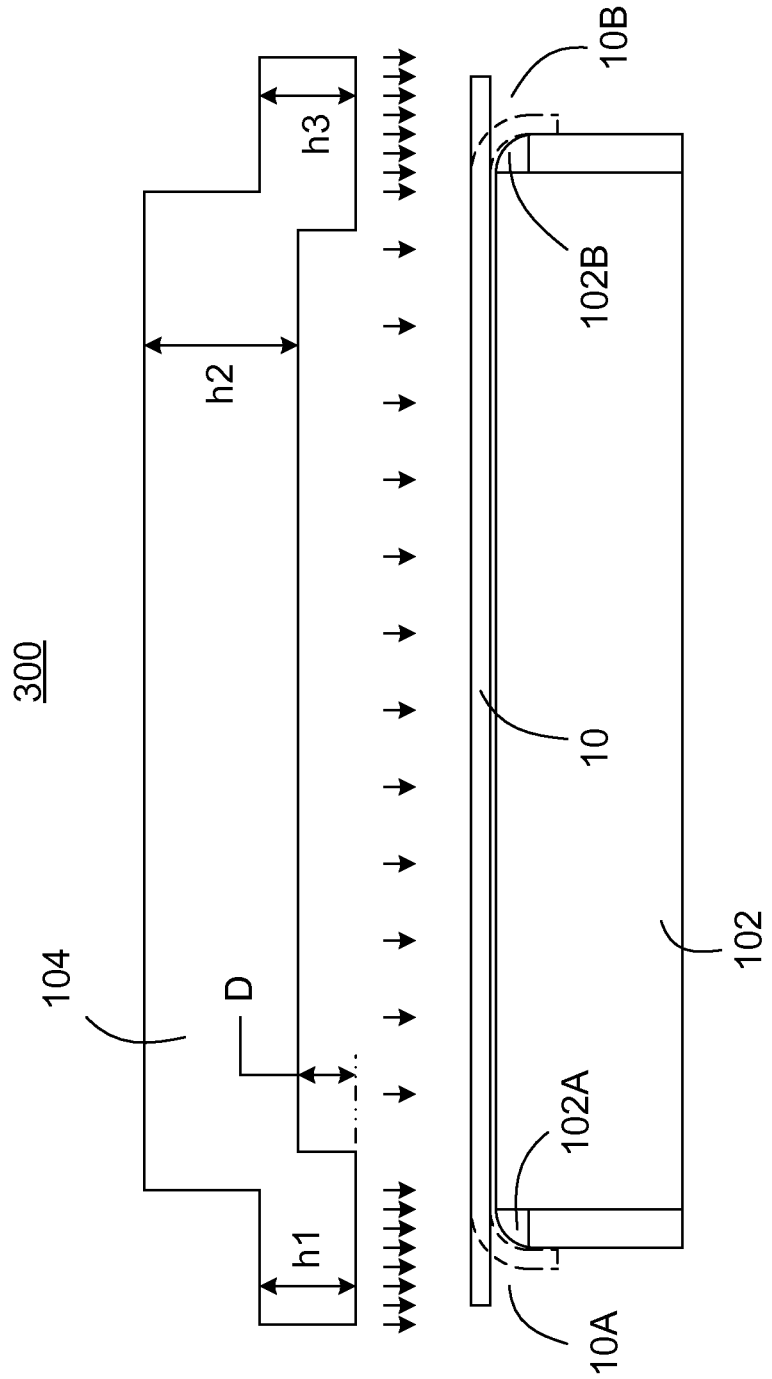
FIG. 8 is an elevational view of a heating element in combination with a reforming system, which heating element has at least one further heat variation feature operating to produce heat of certain characteristics.

Reference is now made to FIG. 8, which is a highly simplified, elevational view of glass sheet reforming system 300. The system 300 includes a heating element 104 in opposing relationship to a carrying structure 102. Notably, the carrying structure 102 includes respective edge molds 102A, 102B disposed in relation to respective edge portions 10A, 10B of the glass sheet 10. The heating element 104 includes a number of sections, a first having a height of h1, a second having a height h2, and a third section having a height of h3. The sections are offset such that the second section is spaced further away from the major surface of the glass sheet 10 by a distance D. In accordance with the description provided above, the glass sheet 10 will receive a greater degree of heat at the edge regions 10A, 10B as compared to the intermediate region, thereby heating the edge regions 10A, 10B to a higher temperature.

The edge regions 10A, 10B are heated to a sufficient temperature (such as near or higher than the softening temperature of the glass) to facilitate bending thereof relative to the intermediate region of the glass sheet 10. The heating function provided by the heating element 104 may be conducted within a heating chamber (not shown) to allow pre-heating of the glass sheet 10 and then heating the opposed edge regions 10A, 10B by conveying the glass sheet 10 under the heating element 104 and/or moving the heating element 104 relative to the glass sheet 10.

Since the glass sheet 10 will receive a greater degree of heat at the edge regions 10A, 10B as compared to the intermediate region, there may be no requirement for a separate shield to interrupt or inhibit heating of the intermediate region; however, if a shield is desired it may also be employed. Lower temperatures at the intermediate region of the glass sheet 10 facilitates maintaining high flatness in such regions while allowing the outermost edge regions of the glass sheet 10 to be exposed to heat (e.g., the softening temperature of the glass sheet 10) and to be bent, without reducing flatness and/or degrading other glass characteristics. This permits deformation of the edge regions 10A, 10B while preventing deformation or introducing quality defects in the intermediate region of the glass sheet 10. In some applications, it might be desirable to only heat a portion of the glass sheet 10 near where the actual bend is to take place (e.g., inward from the edges of the sheet 10) to the softening temperature, and leaving the outermost edge portions of regions 10A, 10B at cooler temperatures (e.g., below the softening temperature) to retain flatness in such portions.

The step of bending each of the opposed edge regions 10A, 10B of the glass sheet 10 is carried out such that they follow a corresponding contour of the first and second edge molds 102A, 102B. Bending can be carried out in various ways, for example, the edge regions 10A, 10B may be heated until gravity urges the edge regions 10A, 10B to drop down under their own weight into conformance with the shape of the mold surfaces of the edge molds 102A, 102B. Alternatively, a conforming member (not shown) may move in a direction to urge the edge regions 10A, 10B into conformance with the shape of the mold surfaces of the edge molds 102A, 102B. The reformed glass sheet 10 can then be cooled.

Figure 9:
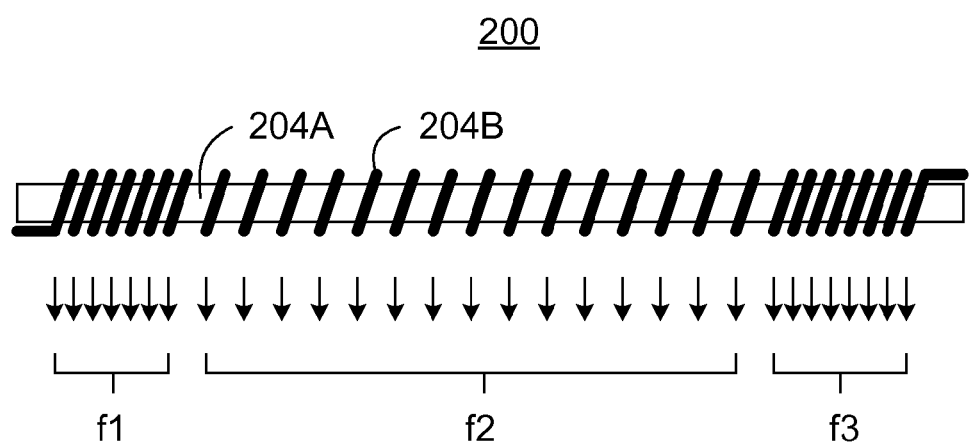
FIG. 9 is a side view of a heating element suitable for use in connection with one or more embodiments herein, which has an alternative heat variation feature operating to produce varying localized heat of alternative characteristics.

Reference is now made to FIG. 9, which is a side view of a heating element 200 suitable for use in connection with one or more embodiments herein, which has an alternative heat variation feature operating to produce varying localized heat of alternative characteristics. In this embodiment, the heating element 200 includes a core material 204A around which a wire 204B is wound. The core 204A may be formed from any suitable material and is preferably not conductive, such as a non-conductive ceramic material. The wire 204B is formed from a suitable conductive material, which produces heat in response to driving current through same. The specific material from which the wire 204B is formed should be selected from any of the known materials in order to produce sufficient heat to elevate the temperature of the glass sheet 10 (not shown) to levels discussed in one or more previous embodiments (such as heating portions of the glass sheet 10 to levels at which the glass sheet 10 may be re-formed).

In this regard, it is noted that the pitch of the wound wire 204B is higher in zones f1 and f3 as compared with zone f2. Thus, there is a higher density of heat produced in zones f1 and f3 as compared with zone f2 (assuming uniform resistivity along the length of the wire 204B). Consequently, a non-uniform localized heating characteristic (illustrated by the arrows) may be achieved when the heating element 200 is disposed adjacent to a glass sheet. Skilled artisans will appreciate the significance of this function in view of the discussion of previous embodiments.

Figure 10:
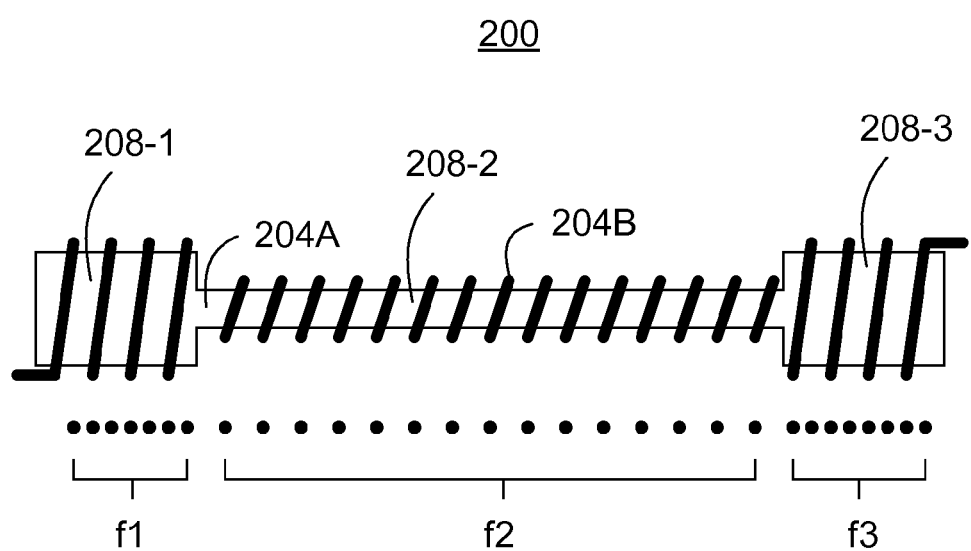
FIG. 10 is a bottom view of a heating element suitable for use in connection with one or more embodiments herein, which has a further alternative heat variation feature operating to produce varying localized heat of alternative characteristics.

Reference is now made to FIG. 10, which is a bottom view of an alternative heating element 200 suitable for use in connection with one or more embodiments herein. This embodiment also exhibits a heat variation feature operating to produce varying localized heat of alternative characteristics. In this embodiment, the heating element 200 also includes a core material 204A around which a wire 204B is wound. Again, the core 204A may be formed from any suitable material, such as a non-conductive ceramic material. The wire 204B is again formed from a suitable conductive material in order to produce sufficient heat to elevate the temperature of the glass sheet (not shown) to suitable levels. In this embodiment, the core 204A has larger surface areas (areas 208-1 and 208-3) in zones f1 and f3 as compared with the area 208-2 in zone f2. These variations in surface area are a result of having differing height and/or width dimensions in the core 204A. Thus, there is a higher amount of heat produced in zones f1 and f3 as compared with zone f2 (again, assuming uniform resistivity along the length of the wire 204B). Consequently, a non-uniform localized heating characteristic (illustrated by the dots) may be achieved when the heating element 200 is disposed adjacent to a glass sheet. Again, skilled artisans will appreciate the significance of this function in view of the discussion of previous embodiments.

Additionally, the differing height and width dimensions of the core 204A may result in one or more sections of the heating element 200 being spaced further away from the glass sheet. As the illustration of FIG. 10 shows the bottom of the heating element 200 (which would be directed toward the glass sheet), the distances from the surfaces of the core 204A and wire 204B to the glass sheet may be invariant from zone to zone. However, if the height dimension also varies, then the distances between respective surfaces of the core 204A and the wires 204B to the glass sheet may also vary and contribute to the heat variation feature (as was also discussed in previous embodiments). As illustrated, the pitch of the wire 204B is constant, yet the variation in heat is obtained via the characteristics above. It is noted, however, that variation in pitch may additionally be employed to provide further degrees of freedom in varying the heating characteristics of the heating element 200.

Although the disclosure herein has been presented with reference to particular embodiments, it is to be understood that these embodiments are merely illustrative of the principles and applications presented. It is therefore to be understood that numerous modifications may be made to the illustrative embodiments and that other arrangements may be devised without departing from the spirit and scope of the present disclosure and coverage as defined by the appended claims.

The invention claimed is:

1. An apparatus, comprising:
a single, continuous electrically conductive heating element having a length extending in a lateral direction between first and second ends, and one or more output surfaces operating to direct heat therefrom in a direction transverse to the lateral direction; and
a carrying structure operable to support a glass sheet such that a major surface of the glass sheet is oriented towards the heat emanating from the one or more output surfaces of the heating element,
wherein the electrically conductive heating element includes at least one heat variation feature operating to produce differing magnitudes of heat to emanate from at least two of the output surfaces of the heating element.

2. The apparatus of claim 1, wherein the at least one heat variation feature operates to produce a differing magnitude of heat to emanate from the output surfaces of the heating element located at at least one of the first and second ends thereof as compared with one or more output surfaces located intermediate thereto.

3. The apparatus of claim 2, wherein the at least one heat variation feature operates to produce higher magnitude heat emanating from the output surfaces located at the first and second ends as compared with intermediate positions.

4. The apparatus of claim 3, wherein:
the length of the heating element is sufficient to span an entire length of the glass sheet; and
the carrying structure operates to orient respective first and second edge regions of the major surface of the glass sheet towards the heat emanating from the first and second ends of the heating element, wherein the apparatus operates to heat the first and second edge regions of the glass sheet to higher temperatures than intermediate regions of the glass sheet.

5. The apparatus of claim 1, wherein the heating element is formed from an electrically conductive ceramic material.

6. The apparatus of claim 5, wherein the electrically conductive ceramic material is taken from the group consisting of silicon carbide and disilicide molybdenum, and titanium diboride.

7. The apparatus of claim 1, wherein:
the heating element includes a height dimension, which is transverse to the length and extends in a direction generally normal to a plane of the major surface of the glass sheet; and
the at least one heat variation feature includes that the height dimension varies between the first and second ends of the heating element, such that the differing magnitudes of heat emanate from the output surfaces of the heating element in response to current flowing through the heating element in the lateral direction.

8. The apparatus of claim 7, wherein the at least one heat variation feature operates to produce a differing magnitude of heat to emanate from the output surfaces of the heating element located at at least one of the first and second ends thereof as compared with one or more output surfaces located intermediate thereto.

9. The apparatus of claim 8, wherein the at least one heat variation feature operates to produce higher magnitude heat emanating from the output surfaces located at the first and second ends as compared with intermediate positions.

10. The apparatus of claim 9, wherein:
the length of the heating element is sufficient to span an entire length of the glass sheet; and
the carrying structure operates to orient respective first and second edge regions of the major surface of the glass sheet towards the heat emanating from the first and second ends of the heating element,
wherein the apparatus operates to heat the first and second edge regions of the glass sheet to higher temperatures than intermediate regions of the glass sheet.

11. The apparatus of claim 1, wherein:
the heating element includes a width dimension, which is transverse to the length and extends in a direction generally parallel to a plane of the major surface of the glass sheet; and
the at least one heat variation feature includes that the width dimension varies between the first and second ends of the heating element, such that the differing magnitudes of heat emanate from the output surfaces of the heating element in response to current flowing through the heating element in the lateral direction.

12. The apparatus of claim 11, wherein the at least one heat variation feature operates to produce a differing magnitude of heat to emanate from the output surfaces of the heating element located at at least one of the first and second ends thereof as compared with one or more output surfaces located intermediate thereto.

13. The apparatus of claim 12, wherein the at least one heat variation feature operates to produce higher magnitude heat emanating from the output surfaces located at the first and second ends as compared with intermediate positions.

14. The apparatus of claim 13, wherein:
the length of the heating element is sufficient to span an entire length of the glass sheet; and
the carrying structure operates to orient respective first and second edge regions of the major surface of the glass sheet towards the heat emanating from the first and second ends of the heating element,
wherein the apparatus operates to heat the first and second edge regions of the glass sheet to higher temperatures than intermediate regions of the glass sheet.

15. The apparatus of claim 1, wherein:
the output surfaces of the heating element include respective surface area portions, which extend in directions generally parallel to a plane of the major surface of the glass sheet; and
the at least one heat variation feature includes that respective surface area portions vary in size between the first and second ends of the heating element, such that the differing magnitudes of heat emanate from the output surfaces of the heating element in response to current flowing through the heating element in the lateral direction.

16. The apparatus of claim 15, wherein the at least one heat variation feature operates to produce a differing magnitude of heat to emanate from the output surfaces of the heating element located at at least one of the first and second ends thereof as compared with one or more output surfaces located intermediate thereto.

17. The apparatus of claim 16, wherein the at least one heat variation feature operates to produce higher magnitude heat emanating from the output surfaces located at the first and second ends as compared with intermediate positions.

18. The apparatus of claim 17, wherein:
the length of the heating element is sufficient to span an entire length of the glass sheet; and
the carrying structure operates to orient respective first and second edge regions of the major surface of the glass sheet towards the heat emanating from the first and second ends of the heating element,
wherein the apparatus operates to heat the first and second edge regions of the glass sheet to higher temperatures than intermediate regions of the glass sheet.

19. The apparatus of claim 1, wherein:
the heating element includes a cross-sectional area dimension, which is transverse to the length and extends in a directions generally normal to the lateral direction; and
the at least one heat variation feature includes that the cross-sectional area dimension varies between the first and second ends of the heating element, such that the differing magnitudes of heat emanate from the output surfaces of the heating element in response to current flowing through the heating element in the lateral direction.

20. The apparatus of claim 19, wherein the at least one heat variation feature operates to produce a differing magnitude of heat to emanate from the output surfaces of the heating element located at at least one of the first and second ends thereof as compared with one or more output surfaces located intermediate thereto.

21. The apparatus of claim 20, wherein the at least one heat variation feature operates to produce higher magnitude heat emanating from the output surfaces located at the first and second ends as compared with intermediate positions.

22. The apparatus of claim 21, wherein:
the length of the heating element is sufficient to span an entire length of the glass sheet; and
the carrying structure operates to orient respective first and second edge regions of the major surface of the glass sheet towards the heat emanating from the first and second ends of the heating element, wherein the apparatus operates to heat the first and second edge regions of the glass sheet to higher temperatures than intermediate regions of the glass sheet.

* * * * *